United States Patent [19]

Stritzke

[11] Patent Number: 4,660,211

[45] Date of Patent: Apr. 21, 1987

[54] MELTING FURNACE FOR VITRIFYING HIGHLY RADIOACTIVE WASTE

[75] Inventor: Detlef Stritzke, Mol, Belgium

[73] Assignee: Deutsche Gesellschaft, Fed. Rep. of Germany

[21] Appl. No.: 563,362

[22] Filed: Dec. 20, 1983

[30] Foreign Application Priority Data

Dec. 22, 1982 [DE]  Fed. Rep. of Germany ....... 3247349

[51] Int. Cl.$^4$ .............................................. C03B 5/02
[52] U.S. Cl. ........................................ 373/36; 373/30
[58] Field of Search ...................... 373/30, 36, 37, 38, 373/39, 41; 65/134, 337, 356

[56] References Cited

U.S. PATENT DOCUMENTS

| | | | |
|---|---|---|---|
| 2,007,755 | 7/1935 | Ferguson | 373/30 |
| 2,250,155 | 7/1941 | Ferguson | 373/30 |
| 4,110,545 | 8/1978 | Shaw et al. | 373/36 |

FOREIGN PATENT DOCUMENTS

| | | |
|---|---|---|
| 51-100111 | 3/1976 | Japan ..................... 373/37 |
| 1137095 | 12/1968 | United Kingdom . |
| 1137096 | 12/1968 | United Kingdom . |
| 1226869 | 3/1971 | United Kingdom . |
| 1522764 | 8/1978 | United Kingdom . |
| 1579562 | 11/1980 | United Kingdom . |
| 1590063 | 5/1981 | United Kingdom . |

*Primary Examiner*—A. D. Pellinen
*Assistant Examiner*—Gregory D. Thompson
*Attorney, Agent, or Firm*—Allegretti, Newitt, Witcoff & McAndrews, Ltd.

[57] ABSTRACT

The invention relates to a melting furnace for vitrifying highly radioactive waste, comprising a melting tank of refractory material and a furnace upper section enclosed by insulation and a steel container. The furnace contains electrodes of ceramic block material for direct heating which comprise part of the wall of the melting tank. Electrical conductors project from the electrodes through the top of the furnace. In order to avoid the danger of the melt flowing into the gaps between the electrodes and the surrounding tank wall and shorting the electrodes, the melt level is maintained below the top surface of the electrodes. In one form of the invention, the electrodes are recessed along the upper edge of the front side facing the melting tank, which recess accommodates a refractory block which is highly resistant to the corrosive effect of the waste at the melt level. The electrodes require no cooling, and are insulated on their back sides which avoids temperature differentials within the electrodes.

11 Claims, 3 Drawing Figures

MELTING FURNACE FOR VITRIFYING HIGHLY RADIOACTIVE WASTE

BACKGROUND OF THE INVENTION

The invention relates to a melting furnace for vitrifying highly radioactive waste which is heated electrically by ceramic electrodes.

PRIOR ART

With the known "Pamela" process, a mixture of a highly enriched waste concentrate and borosilicate glass frit is applied to the surface of the molten bath in an electrically directly-heated ceramic melting furnace. The supply of energy into the glass melt for the vaporizing of the liquid phase fraction, for the thermal denitrating of the salts, and for the fusing into the glass of the waste oxides which are formed, is carried out by the Joules's principle by means of direct passage of current through the molten mass at a temperature of about 1150° C. Suitable electrode materials are substances which have a melting range or point which is substantially higher than the temperature at which the melting furnace is operated, a high resistance to corrosion and erosion with respect to the glass melt, a high mechanical stability at the operating temperature and, at this temperature, a substantially lower specific electrical resistivity than the glass melt. The choice of the electrode materials is dependent in such cases on the specific requirements such as, for example, the operating temperature and the aggressive nature of the molten mass.

It is known to use tin oxide electrodes for melting furnaces which are electrically and directly heated, cf. "Tin Oxide Electrodes, Their Manufacture, Properties and Application to Glass Furnaces", Glassworks Equipment Limited.

The tin oxide electrodes consist of slip-case, cylindrical, square or rectangular blocks. The said publication shows, inter alia, a tin oxide electrode with power supply cables consisting of silver. Several of these individual electrodes can be assembled to form relatively large blocks, so-called "stacks", for the purpose of increasing the effective electrode surface or area, these stacks forming a constituent part of the tank of the melting furnace. The power supply is carried out as follows: A bore is formed in the rear of the tin oxide electrode. A tin oxide rod, around which is wound a thin silver sheet, is pressed into the said bore. Since the rod and the electrode consist of the same material, any thermic stresses with a change in temperature are avoided. The silver sheet projects beyond the rod and is used as current connection or terminal. With the relative strong currents which flow through the electrode (several hundred amperes), this arrangement provides a sufficiently large transition or junction surface to accommodate the current flow between the silver metal and the tin oxide electrode. Furthermore, the silver projects a sufficient distance into the hot region of the tin oxide electrode so that the silver at the front end of the rod melts, since at this position temperatures exceed the melting point of silver (963° C.). By this means, an intimate electrical contact is obtained between the power supply cable consisting of metal, and the ceramic electrode material of tin oxide. Longitudinally of the electrode stacks, from the melt towards the rear end of the electrodes, a temperature gradient has to be developed which prevents glass emerging outwardly between the joints of the electrodes. For this reason, and also on account of the relatively low melting point of the silver, the rear ends of the electrodes have to be cooled. The procedure which is customary in the glass industry is the transfer of heat from the rear ends of the electrodes to the outside ambient air by convection, i.e., the rear ends of the electrodes are exposed.

The known electrode construction has the following disadvantages, especially in connection with the vitrification of highly radioactive waste. During the operating period, and with progressive corrosion of the ceramic material forming the melting tank and electrodes, highly radioactive glass is able to escape at the joints between the tin oxide electrodes or between the electrodes and the refractory material of the melting tank. In an extreme case, this escape of glass can lead to uncontrolled no-load operation of the furnace, since the flow of glass is not readily stopped on account of the "entrained" latent heat of the glass. During operation it is necessary for a reduced pressure to be maintained in the upper furnace space of the melting furnace, with the additional requirement of a minimization of leakage air. With electrodes having opened rear ends, a considerable amount of leakage air occurs through the insulation.

German Offenlegungsschrift No. 24 26 328 shows a tank furnace for the melting of mineral substances having molybdenum electrodes, these being cooled by means of water. The construction of the electrodes and the nature and manner of the arrangement in the wall of the meltng furnace cannot be derived from this printed specification.

German Offenlegungsschrift No. 26 31 220 shows a furnace for the fusing of glass with radioactive constituents with which tin oxide electrodes or molybdenum electrodes are used. The construction of the electrodes and the nature and manner of the arrangement in the wall of the melting furnace are also not fully described in this printed specification.

The electrodes in both known furnaces are arranged beneath the surface of the melt so that, as already previously mentioned, the danger exists that in the course of time molten glass emerges at the joints between the electrodes and between the electrodes and the refractory material of the melting tank.

With these prior known melting furnaces for vitrifying radioactive waste, the cooling of the electrodes was effected either by heat dissipation due to convection with opened rear ends of the electrodes, or with the aid of a forced cooling system. In the latter system, the conventionally-employed steel container, in which the melting furnace with its insulation is fitted, is closed at the rear ends of the electrodes. By means of an annular nozzle system, a gentle air current was directed towards the rear end of the electrodes, and in this way the temperature was held at the required value. In the event of failure of the supply of coolant air, there is the danger of an impermissible rise in temperature at the rear ends of the electrodes. As a consequence of the absence of a temperature gradient, glass is able to escape between and alongside the electrode stacks. An inherent degree of safety is not provided. A not inconsiderable fraction of the quantity of air required for cooling purposes has to be processed in addition to the other quantities of radioactive air occurring during the process. Strong fluctuations of the volumetric flow of compressed air are able to produce thermoshocks on the ceramic electrode material. Since these electrode materials are sensitive to changes in temperature, there is the danger of fissures or cracks being formed which can lead to the previously mentioned egress of glass.

THE INVENTION

It is the object of the present invention to design a melting furnace of this type without the aforementioned disadvantages, without the danger of any egress of melt, and without a forced cooling for the electrodes. Furthermore, the occurrence of leakage air is minimized, the power consumption is reduced, and the general safety of the melting furnace is increased.

These objects are achieved by providing ceramic block electrodes which are fitted in a recess with a refractory block along the top edge of their sides facing the melt, the height of the refractory block being selected so that the surface of the melt, which is highly corrosive, is always in contact with the refractory block rather than the less-resistant electrode block. Furthermore, the level of the melt must be maintained below the joint between the top of the electrode and the overlying furnace wall.

By means of the construction in accordance with the invention, the maximum obtainable glass level within the furnace is always below the top edge of the electrodes. This means that glass is unable to seep through the joints between the block electrodes and between the electrode and the refractory material of the melting tank. What is also avoided in this way is the danger of this seeping glass coming into contact with the metal power supply cables and forming an electrical bridge, by-passing the electrodes, between the power supply cables and the glass melt. It is possible, by means of the construction according to the invention, to dispense with a passively or actively operating cooling system for the electrodes. The steel container of the furnace can be of a completely enclosed construction so that, in practice, air leakage no longer occurs. The melting furnace is inherently safer, since any glass possibly escaping laterally at the electrodes congeals along the path to the outer steel container because of an exactly balanced insulation.

By running the power conductors upwardly through the top of the electrodes rather than horizontally out the back, they are protected from glass melt that might rise vertically in a gap between adjacent construction blocks by capillary action. Also, the back sides of the electrodes can be completely covered with insulation.

With the totally-insulated melting furnace constructed according to the invention, the heat losses through the rear ends of the electrodes are smaller by about 80% than those with the conventional furnaces where the rear of the electrodes are exposed and not insulated. The power consumption of the furnace is also correspondingly lower because it is not necessary to cool the back side of the electrodes. A melting furnace operating for a period of two years produced a savings due to reduced power consumption of approximately DM 40,000, assuming a cost for power of DM 0.15/KwH.

Because a more uniform temperature exists within the electrodes, a good electrical heat transfer from the metallic power supply conductors to the ceramic electrode material is obtained over the entire (tin oxide/metal) contact surface. It is not longer necessary to use a metal of low melting point, for example, such as silver. Because of the small temperature differences within the electrode materials, any danger of cracks being formed in this material, due to differential expansion, is practically eliminated. Even if fissures should sometimes be formed, these are immediately filled because of the low surface tension of the liquid glass with glass. Although the electrical conductivity of the glass at 1100° C. is lower by a factor of approximately 1000 than that of the tin oxide, the thickness of the fissure, for which 1 mm may be assumed as an example, liberates an insignificantly higher energy output in this zone which can result in a local raising of the temperature. Because of the rise in temperature in this fissure or crack, the electrical conductivity of the glass increases and the energy which is here liberated once again becomes smaller. In practice, an equilibrium will be adjusted, this being dependent on the physical constants of the materials, the structure of the insulation, and the temperature in the melting bath.

It has been shown that the glass melt in the area of the melt line is very aggressive and that the electrode material is leached out due to the aggressiveness in the glass melt line area. This disadvantage is largely obviated by the present invention.

Advantageous and expedient further developments of the solution of the problem in accordance with the invention are characterized in the claims.

BRIEF DESCRIPTION OF THE DRAWINGS

The invention is now to be described by reference to the accompanying drawing in which is shown one constructional form of the invention. In the drawing.

DETAILED DESCRIPTION

Figures 1, 1A:
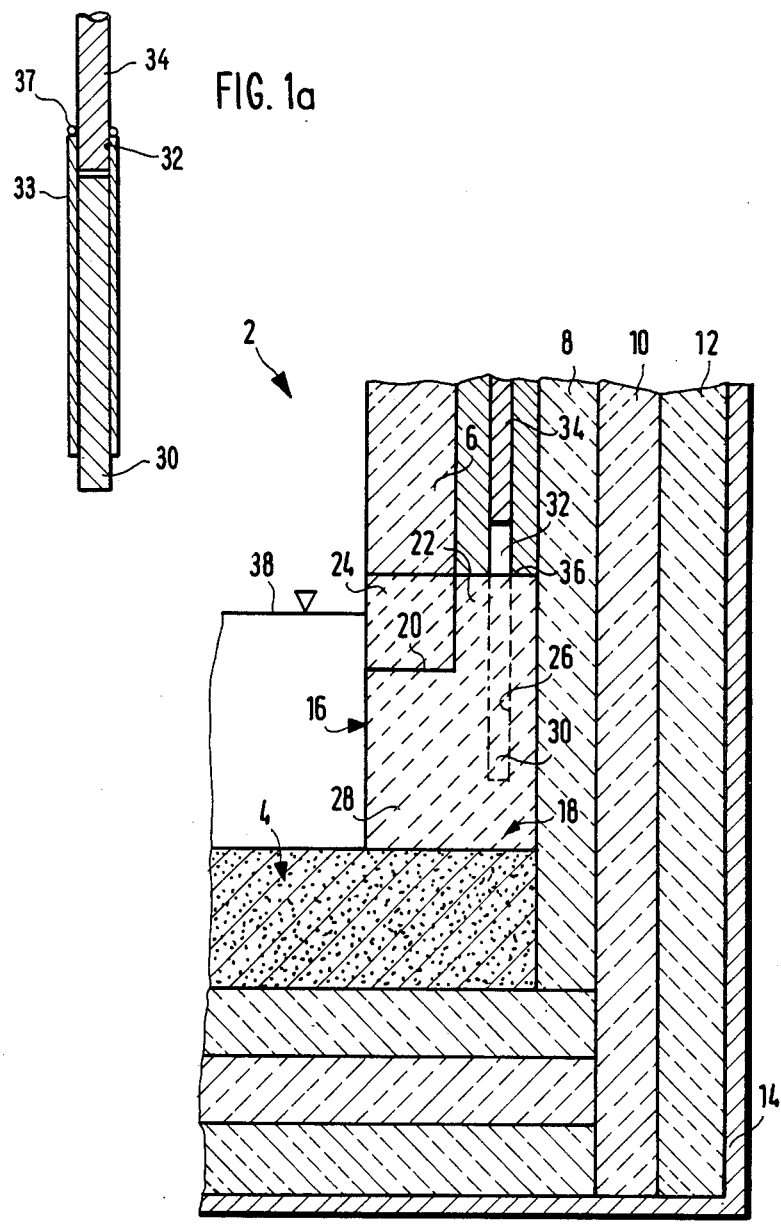
FIG. 1 is a partial section through an electrode arrangement constructed according to the invention in a ceramic melting furnace.
FIG. 1a is a detailed section through the elements connecting the electrode to a power source.

The drawing shows a melting furnace 2, the melting tank 4, of which consists of refractory ceramic material which is resistant to corrosion and high temperature. Arranged above the melting tank 4 is the so-called insulated upper furnace section having a refractory layer 6 which consists of a material which is resistant to temperature changes and corrosion. The melting tank and the upper furnace section are enclosed by a plurality of insulating layers 8, 10 and 12 of castable alumina or similar ceramic material. This arrangement, consisting of melting tank and insulating layers, is enclosed in a gas-tight steel container 14.

The side wall 16 of the melting tank 4 includes electrodes 18 which form part of the wall 16. The electrodes 18 are shaped in the form of blocks and are made from ceramic material, for example, tin oxide. The glass melt along the melt line is highly corrosive and will attack tin oxide. At the top edge facing the interior of the furnace, the tin oxide blocks are cut out to provide a rectangular, step-like recess 20. This forms an upwardly directed projection 22 which is rectangular in cross-section, and which embraces a block 24 filling the cut-out, which block resists the corrosive effects of the melt line and comprises part of the wall 16 of the melting tank. Block 24 is highly refractory silicate rock, or, for example, can consist of 30% chromium oxide, 30% zirconium oxide, 25% aluminum oxide, and 15% glass fibers.

Formed in the projection 22, i.e., the top of the electrode 18, is a vertical blind bore 26 which extends into the lower part 28 of the electrode 18 and into which a high-melting metal electrode rod 30 is pressed. Since the electrodes 18 are higher than they are wide, the vertically-disposed rod provides a greater contact area than one horizontally disposed. The electrode rod 30 contacts a current connection or terminal 32 extending above the electrode projection 22 and in conducting contact with a power supply system through conductor 34. The power supply conductor consisting of a temperature- and corrosion-resistant metal, is disposed between the wall of the top furnace 6 and the insulating layer 8, and is enclosed by insulation 35.

The electrode rod 30 may be enclosed by a thin metal sheath 33 which extends above the projection 22. The upper end of sheath 33 serves as current connector or terminal 32. The current terminal 32 is advantageously threaded, soldered, or welded at 37 to the power supply conductors 34. See FIG. 1a. The terminal 32 and power supply conductors 34 usually are made of different materials.

Because the temperatures which obtain at this position are in the region of 1100° C., the metal sheath 33 which surrounds the electrode rod 30 consists of platinum, a metal resistant to high temperature and corrosion, instead of silver, as in prior known melting furnaces. The temperature differential across the electrode 18 is about 100° C. (1200° C. to 1100° C.), whereas prior art furnaces show a differential of 500° C. to 600° C.

The metal of the current supply conductors 34 may, for example, be highly heat-resistant chrome-nickel steel or pure nickel. The union between chrome-nickel steel and platinum or between nickel and platinum can be effected with the aid of high-temperature solder at 37 (operating temperatures between 1150° C. and 1300° C.) and/or mechanically by a screw-threaded or pinched connection.

Figure 2:
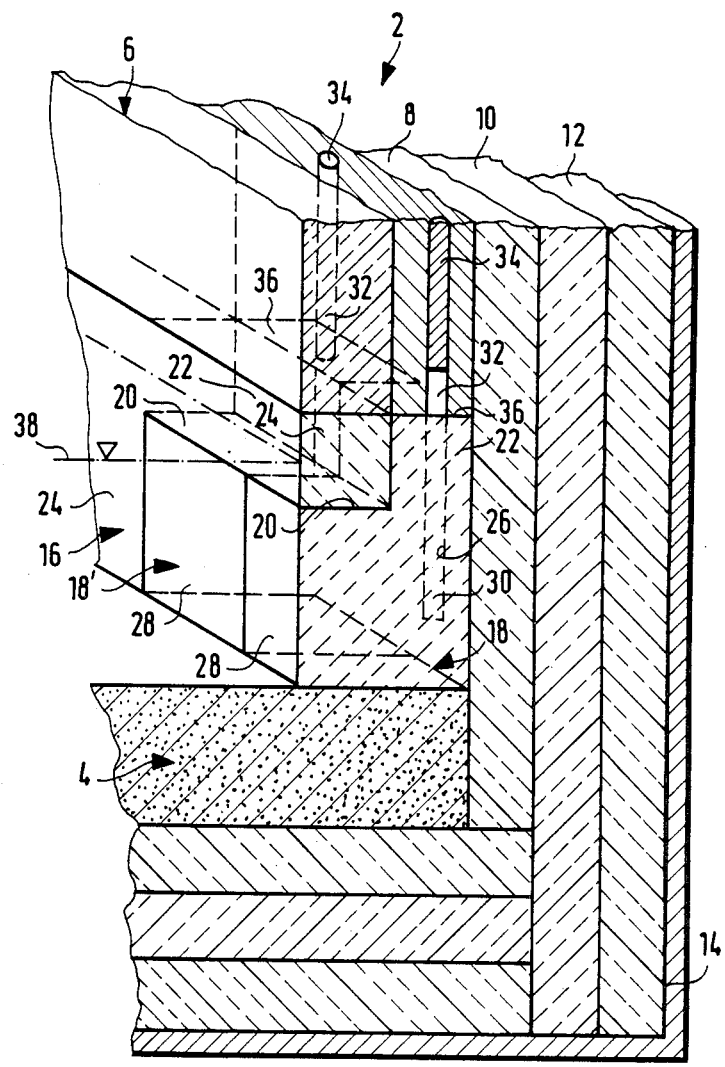
FIG. 2 is a view similar to FIG. 1 with an additional perspective representation of an electrode stack arrangement.

Instead of single electrodes it is possible to provide electrode stacks consisting of several single electrodes (see FIG. 2), in which a stack of two electrodes 18, 18' is represented diagrammatically. It is possible in this way to enlarge the effective electrode surface.

It is also possible for the same materials to be used for the power supply conductors 34 and the current terminal 32.

The electrodes 18 are so arranged that the top edge 36 is always situated above the maximum level 38 which can be reached by the glass melt. As a consequence, glass cannot seep through the joint beneath refractory layer 6 and edge 36, or between the electrodes and the refractory material of the melting tank. Thus, the melt cannot come into contact with the terminal 32 or metal power supply conductor 34 and form an electric bridge or short between power supply and glass melt, by-passing the electrodes.

As already previously mentioned, platinum is used instead of silver for the current connection or terminal surrounding the electrode rod. Since the heat losses occurring with the melting furnace according the the present constructional form are substantially lower than with conventional furnaces, the additional expenditure for the more costly platinum is recovered by the energy savings.

Cooling means, whether passive or active, for the electrodes is not necessary, and this saves energy.

Figure 3:
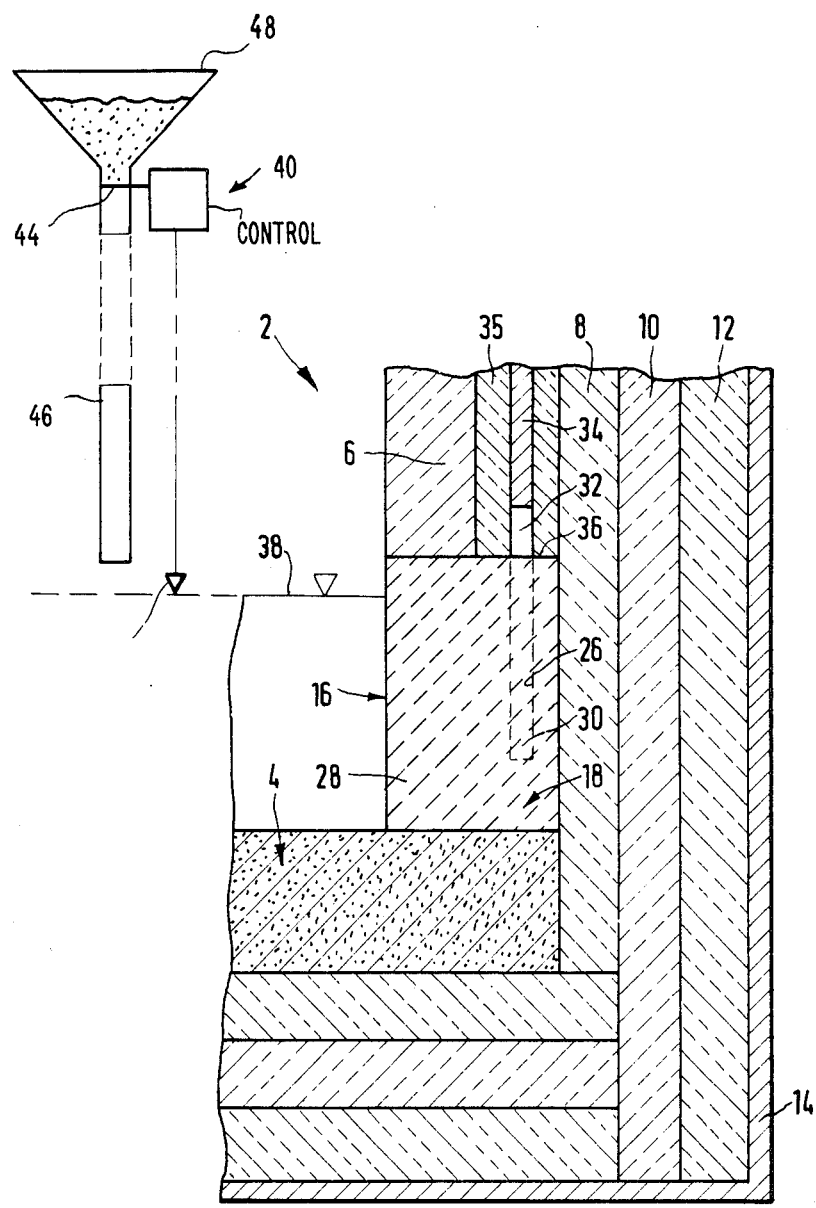
FIG. 3 is a view similar to FIG. 1 which also includes means for controlling the melt level.

Means 40 for maintaining a constant melt level 38 is shown in FIG. 3. In this form of the invention, the melt line is in contact with the face of electrode 18, but is below the interface of the top 36 of the electrode with the base of refractory layer 6. The means comprises a level detector 42 which controls a slide valve 44 which releases material to be vitrified from hopper 48 through feed tube 46. Apparatus of this kind is known in the art. Of course, the level can be maintained through visual observation and manually controlling the delivery of said material.

I claim:

1. A refractory melting furnace containing a melt of highly radioactive waste mixed with borosilicate glass, said furnace comprising
   a melting tank and an upper insulated furnace section enclosed in a steel container,
   said melting tank having walls comprising an electrically-conducting ceramic block electrode for direct heating of said melt and an overlying refractory layer, a joint between the top surface of said block electrode and said overlying refractory layer,
   a power supply conductor vertically-disposed in said insulated furnace upper section and extending into said block electrode through said joint and said top surface, and
   means for maintaining the melt line of said radioactive mixture below said top surface.

2. A furnace according to claim 1 wherein said block electrode has a recess extending along said top surface and facing said melting tank, and a refractory block disposed in said recess to protect said block electrode in the area of said melt line.

3. A furnace according to claim 2 wherein said power supply conductor is connected to an electrode rod disposed in a downwardly-extending blind bore provided in said top surface of said electrode block adjacent said recess.

4. A furnace according to claim 3 wherein said electrode rod is enclosed in a metal sheath which extends above said top surface of said electrode block and serves as a connection terminal to said power supply conductor.

5. A furnace according to claim 4 wherein said metal sheath has a melting point above 1100° C.

6. A furnace according to claim 4 wherein said metal sheath is platinum.

7. A furnace according to claim 4 wherein said metal sheath is connected to said power supply conductor by soldering, or welding, or by a screw-threaded connection.

8. A furnace according to claim 1 wherein a layer of insulation is disposed between said power supply conductor and said insulation of said upper furnace section.

9. A furnace according to claim 1 wherein said power supply conductor consists of chrome-nickel steel or pure nickel.

10. A furnace according to claim 4 wherein said power supply conductor and said connection terminal consist of the same highly heat-resistant metal.

11. A furnace according to claim 1 in which said insulated upper furnace section includes multiple layers of insulating materials between said block and said steel container.

* * * * *